(12) United States Patent
Uemura et al.

(10) Patent No.: US 11,446,965 B2
(45) Date of Patent: Sep. 20, 2022

(54) PNEUMATIC TIRE

(71) Applicant: The Yokohama Rubber Co., LTD., Tokyo (JP)

(72) Inventors: Takanori Uemura, Hiratsuka (JP); Takayuki Shiraishi, Hiratsuka (JP); Hiraku Kouda, Hiratsuka (JP); Tatsuro Shinzawa, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 257 days.

(21) Appl. No.: 16/486,489

(22) PCT Filed: Dec. 22, 2017

(86) PCT No.: PCT/JP2017/046212
§ 371 (c)(1),
(2) Date: Aug. 15, 2019

(87) PCT Pub. No.: WO2018/150732
PCT Pub. Date: Aug. 23, 2018

(65) Prior Publication Data
US 2019/0359009 A1    Nov. 28, 2019

(30) Foreign Application Priority Data

Feb. 15, 2017    (JP) .............................. JP2017-025759

(51) Int. Cl.
*B60C 11/12* (2006.01)
*B60C 11/13* (2006.01)
*B60C 11/03* (2006.01)

(52) U.S. Cl.
CPC ...... *B60C 11/1392* (2013.01); *B60C 11/0304* (2013.01); *B60C 11/1204* (2013.01);
(Continued)

(58) Field of Classification Search
CPC ............ B60C 11/1281; B60C 11/1204; B60C 11/1392; B60C 11/1218; B60C 11/12;
(Continued)

(56) References Cited

U.S. PATENT DOCUMENTS

2010/0084062 A1* 4/2010 Miyazaki ............ B60C 11/1281
152/209.18
2013/0081744 A1* 4/2013 Kameda .............. B60C 11/1218
152/209.5
(Continued)

FOREIGN PATENT DOCUMENTS

CN    105644275         6/2016
EP    0847878 A2 *      6/1998     ............. B60C 11/13
(Continued)

OTHER PUBLICATIONS

Machine Translation EP 0847878 A2; Rodewald, Helmut (Year: 1998).*

(Continued)

*Primary Examiner* — Robert C Dye
*Assistant Examiner* — Nicholas J Weiler
(74) *Attorney, Agent, or Firm* — Thorpe North & Western

(57) ABSTRACT

In a pneumatic tire, a sipe includes an edge on a leading side and an edge on a trailing side; the edge on the leading side and the edge on the trailing side each include a chamfered portion shorter than a sipe length of the sipe; a non-chamfered region in which other chamfered portions are not present is provided at portions facing the chamfered portions of the sipe; and for all chamfered portions, including at least the chamfered portions of the sipe, formed on grooves other than main grooves, a total projected area $A_{IN}$ of the chamfered portions located on a vehicle mounting inner side and (Continued)

a total projected area $A_{OUT}$ of the chamfered portions located on a vehicle mounting outer side satisfy a relationship $A_{IN} > A_{OUT}$.

8 Claims, 10 Drawing Sheets

(52) U.S. Cl.
CPC ...... B60C 11/1259 (2013.01); B60C 11/1272 (2013.01); B60C 11/1281 (2013.01)

(58) Field of Classification Search
CPC ............. B60C 11/0304; B60C 11/1236; B60C 2011/1295; B60C 11/04
See application file for complete search history.

(56) References Cited

U.S. PATENT DOCUMENTS

| | | |
|---|---|---|
| 2013/0206298 A1 | 8/2013 | Guillermou et al. |
| 2013/0248068 A1 | 9/2013 | Nakata |
| 2015/0210121 A1 | 7/2015 | Sanae |
| 2016/0039249 A1* | 2/2016 | Takahashi ............ B60C 11/1236 152/209.15 |
| 2016/0152090 A1* | 6/2016 | Takemoto ........... B60C 11/0306 152/209.24 |
| 2016/0297254 A1 | 10/2016 | Numata |
| 2017/0225515 A1* | 8/2017 | Hayashi .................. B60C 11/12 |
| 2018/0170114 A1 | 6/2018 | Hayashi |
| 2019/0001753 A1* | 1/2019 | Hayashi .................. B60C 11/04 |

FOREIGN PATENT DOCUMENTS

| | | |
|---|---|---|
| EP | 3 015 286 | 5/2016 |
| JP | 2005075213 A * | 3/2005 |
| JP | 2013-035345 | 2/2013 |
| JP | 2013-537134 | 9/2013 |
| JP | 2015-047977 | 3/2015 |
| JP | 2015-140047 | 8/2015 |
| JP | 2015-160487 | 9/2015 |
| JP | 2017-001584 | 1/2017 |
| WO | WO 2012/032144 | 3/2012 |
| WO | WO 2012/098895 | 7/2012 |
| WO | WO 2015/083474 | 6/2015 |
| WO | WO 2016/031154 | 3/2016 |
| WO | WO 2016/199519 | 12/2016 |

OTHER PUBLICATIONS

JP 2005075213 Machine Translation; Nakajima, Takehiko (Year: 2005).*

International Search Report for International Application No. PCT/JP2017/046212 dated Mar. 20, 2018, 4 pages, Japan.

* cited by examiner

PNEUMATIC TIRE

TECHNICAL FIELD

The present technology relates to a pneumatic tire and particularly relates to a pneumatic tire with a designated vehicle mounting direction that can provide improved steering stability performance on dry road surfaces and improved steering stability performance on wet road surfaces in a compatible manner and further provide enhanced noise performance by devising a sipe chamfer shape.

BACKGROUND ART

In the related art, in a tread pattern of a pneumatic tire, a plurality of sipes are formed in a rib defined by a plurality of main grooves. By providing such sipes, drainage properties are ensured, and steering stability performance on wet road surfaces is exhibited. However, when a large number of sipes are disposed in a tread portion in order to improve the steering stability performance on wet road surfaces, the rigidity of the ribs decreases, which has the disadvantage that steering stability performance on dry road surfaces deteriorates. Additionally, when a large number of sipes are disposed in the tread portion, it is difficult to achieve noise performance (reduced noise) and steering stability performance on wet road surfaces in a compatible manner because the popping sound and the pattern noise when running are emitted to the outside of the vehicle and noise of the tire tends to increase.

Various pneumatic tires have been proposed in which sipes are formed in a tread pattern and chamfered (for example, see Japan Unexamined Patent Publication No. 2013-537134). When the sipes are formed and chamfered, edge effects may be lost depending on the shape of the chamfers, and depending on the dimensions of the chamfers, improvement of steering stability performance on dry road surfaces and improvement of steering stability performance on wet road surfaces may be insufficient.

SUMMARY

The present technology provides a pneumatic tire with a designated vehicle mounting direction that can provide improved steering stability performance on dry road surfaces and improved steering stability performance on wet road surfaces in a compatible manner and further provide enhanced noise performance by devising a sipe chamfer shape.

A pneumatic tire according to an embodiment of the present technology is a pneumatic tire with a designated mounting direction with respect to a vehicle, including:

in a tread portion, main grooves extending in a tire circumferential direction; and a sipe extending in a tire lateral direction disposed in ribs defined by the main grooves; wherein the sipe includes an edge on a leading side and an edge on a trailing side;

the edge on the leading side and the edge on the trailing side each include a chamfered portion shorter than a sipe length of the sipe;

a non-chamfered region in which other chamfered portions are not present is provided at portions facing the chamfered portions of the sipe; and for all chamfered portions, including at least the chamfered portions of the sipe, formed on grooves other than the main grooves, a total projected area $A_{IN}$ of the chamfered portions located on a vehicle mounting inner side and a total projected area $A_{OUT}$ of the chamfered portions located on a vehicle mounting outer side satisfy a relationship $A_{IN} > A_{OUT}$.

In an embodiment of the present technology, the pneumatic tire has a designated mounting direction with respect to a vehicle and includes sipes that extend in the tire lateral direction in ribs defined by the main grooves. The chamfered portion that is shorter than the sipe length of the sipe is provided on each of the edge on the leading side and the edge on the trailing side of the sipe, and the non-chamfered regions in which other chamfered portions are not present are disposed at the portions facing the chamfered portions of the sipe. Thus, the drainage effect can be improved with the chamfered portions, and a water film can be effectively removed by the edge effect in the non-chamfered regions. As a result, the steering stability performance on wet road surfaces can be greatly improved. Moreover, the chamfered portion and the non-chamfered region are disposed alongside each other on the edge on the leading side and the edge on the trailing side in this manner. Thus, the effect of enhancing wet performance as described above when braking and driving can be maximally achieved. Additionally, compared to a known chamfered sipe, the chamfered area can be minimized, so the steering stability performance on dry road surfaces can be improved. As a result, the steering stability performance on dry road surfaces and the steering stability performance on wet road surfaces can be improved in a compatible manner. Furthermore, the vehicle mounting outer side is a large contributor to noise performance. Thus, for all the chamfered portions, including at least the chamfered portions of the sipes, which are chamfered portions formed on grooves other than the main grooves, by the total projected area $A_{OUT}$ of the chamfered portions located on the vehicle mounting outer side being relatively small, the ground contact pressure on the vehicle mounting outer side can be reduced, which leads to a reduction in noise generated when running. As a result, the steering stability performance on dry road surfaces, the steering stability performance on wet road surfaces, and noise performance can be enhanced in a well-balanced manner.

In an embodiment of the present technology, preferably a maximum depth x (mm) of the sipe and a maximum depth y (mm) of the chamfered portions satisfy a relationship of Formula (1); and a sipe width of the sipe is constant in a range from an end portion located on an inner side in a tire radial direction of the chamfered portion to a groove bottom of the sipe. In this way, compared to a known chamfered sipe, the chamfered area can be minimized, so the steering stability performance on dry road surfaces can be improved. As a result, the steering stability performance on dry road surfaces and the steering stability performance on wet road surfaces can be improved in a compatible manner.

$$x \times 0.1 \leq y \leq x \times 0.3 + 1.0 \tag{1}$$

In an embodiment of the present technology, the total projected area $A_{IN}$ of the chamfered portions located on the vehicle mounting inner side and the total projected area $A_{OUT}$ of the chamfered portions located on the vehicle mounting outer side preferably satisfy Formula (2). In this way, an effect of suppressing noise can be obtained and both the steering stability performance on dry road surfaces and the steering stability performance on wet road surfaces can be enhanced. More preferably, the range is from 10% to 30%.

$$3\% \leq (A_{IN} - A_{OUT})/A_{IN} \times 100\% \leq 50\% \tag{2}$$

In an embodiment of the present technology, preferably the sipe is disposed in two or more ribs of the ribs defined by the main grooves. In this way, the steering stability performance on dry road surfaces and the steering stability performance on wet road surfaces can be enhanced in a well-balanced manner.

In an embodiment of the present technology, preferably, the all chamfered portions are configured by the chamfered portion of the sipe. In this way, the steering stability performance on dry road surfaces and the steering stability performance on wet road surfaces can be enhanced in a well-balanced manner.

In the present technology, "projected area of the chamfered portion" is the area measured when the chamfered portion is projected in a normal line direction of the road contact surface of the tread portion.

DETAILED DESCRIPTION

Figure 1:
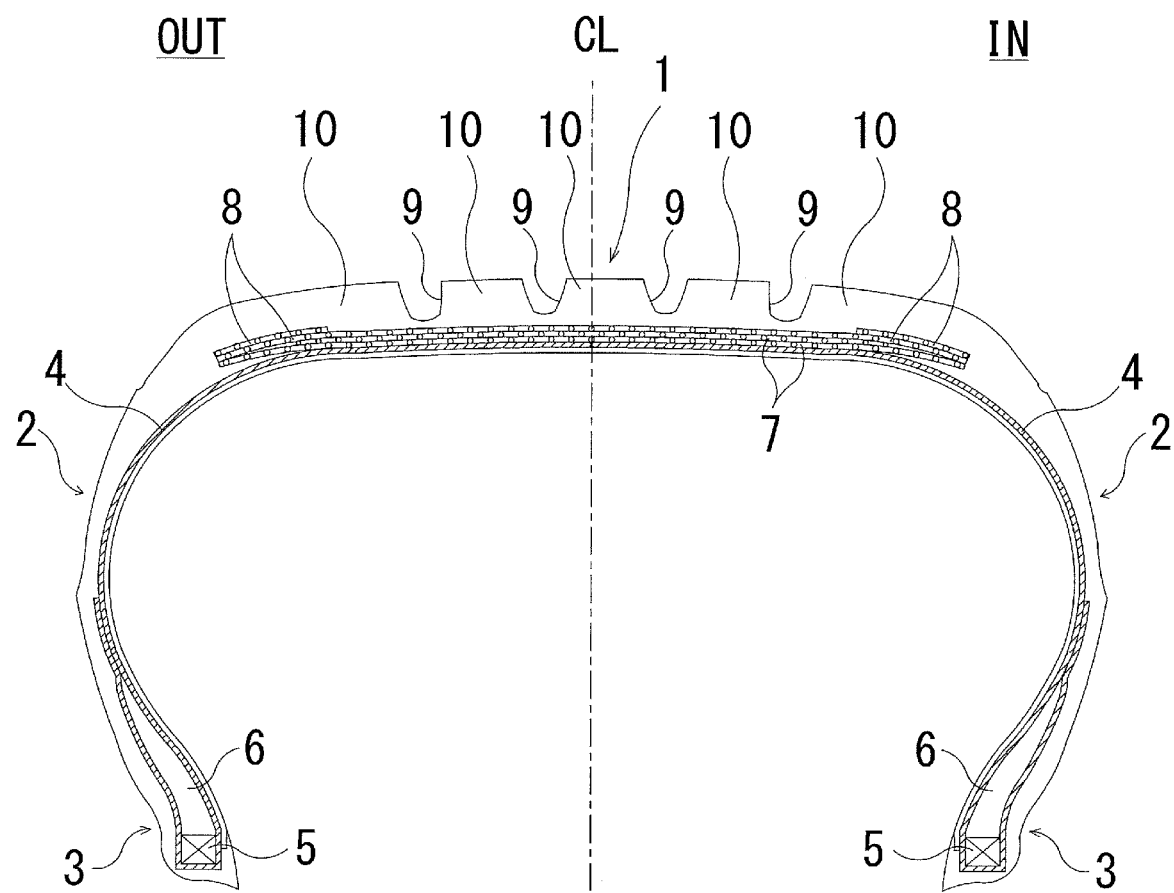
FIG. 1 is a meridian cross-sectional view illustrating a pneumatic tire according to an embodiment of the present technology.
Figure 2:
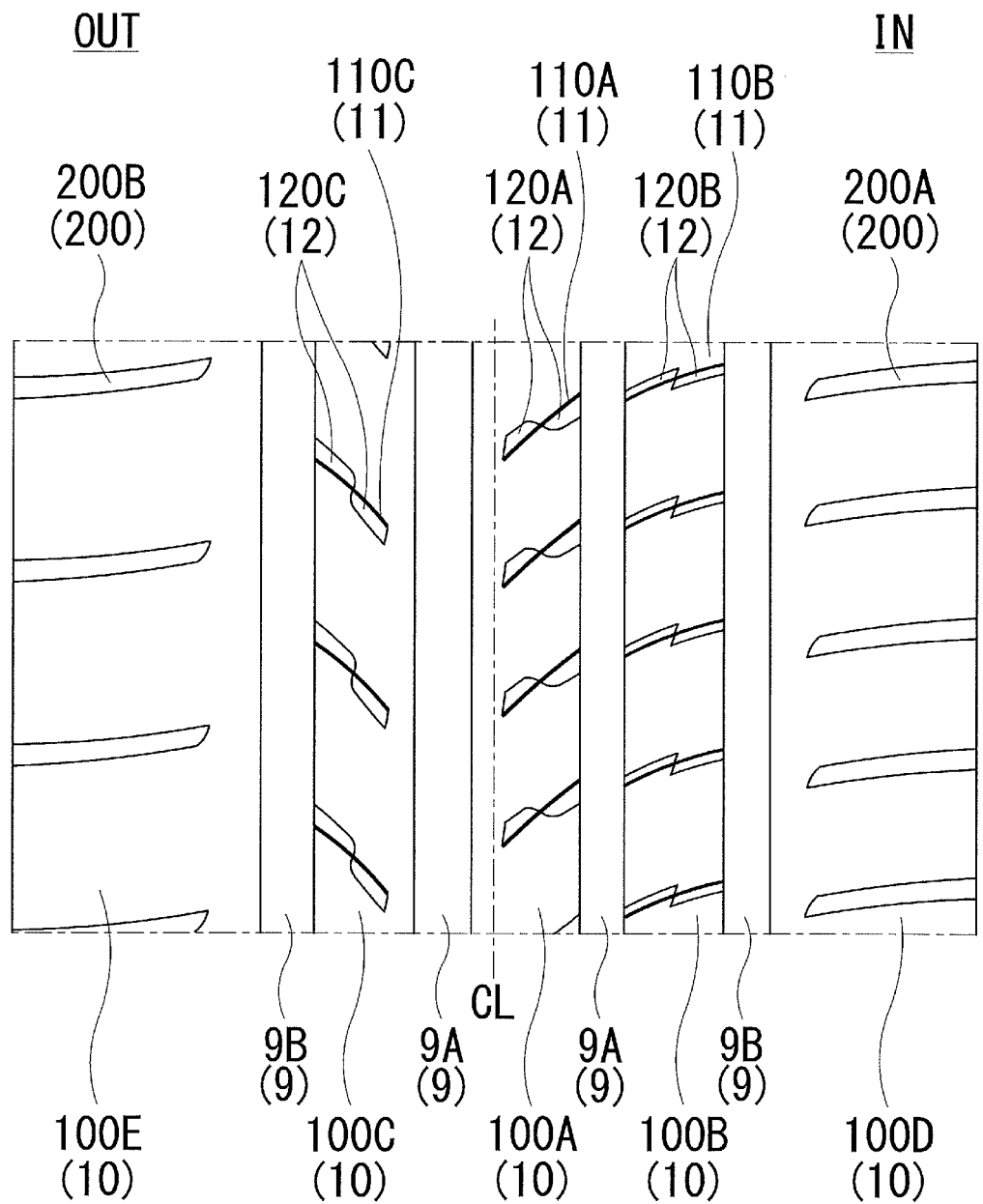
FIG. 2 is a plan view illustrating an example of a tread portion of a pneumatic tire according to an embodiment of the present technology.

Configurations of embodiments of the present technology are described in detail below with reference to the accompanying drawings. In FIGS. 1 and 2, CL denotes the tire center line.

As illustrated in FIG. 1, a pneumatic tire according to an embodiment of the present technology has a designated mounting direction with respect to a vehicle. "IN" indicates the side inward of the tire center line CL with respect to the vehicle when the tire is mounted on the vehicle (hereinafter referred to as "vehicle mounting inner side"), and "OUT" indicates the side outward of the tire center line CL with respect to the vehicle when the tire is mounted on the vehicle (hereinafter referred to as "vehicle mounting outer side"). As illustrated in FIG. 1, the pneumatic tire includes an annular tread portion 1 extending in the tire circumferential direction, a pair of sidewall portions 2, 2 disposed on both sides of the tread portion 1, and a pair of bead portions 3, 3 disposed inward of the sidewall portions 2 in the tire radial direction.

A carcass layer 4 is mounted between the pair of bead portions 3, 3. The carcass layer 4 includes a plurality of reinforcing cords extending in the tire radial direction and is folded back around bead cores 5 disposed in each of the bead portions 3 from a tire inner side to a tire outer side. A bead filler 6 having a triangular cross-sectional shape formed from rubber composition is disposed on the outer circumference of the bead core 5.

A plurality of belt layers 7 are embedded on the outer circumferential side of the carcass layer 4 in the tread portion 1. The belt layers 7 each include a plurality of reinforcing cords that are inclined with respect to the tire circumferential direction, with the reinforcing cords of the different layers arranged in a criss-cross manner. In the belt layers 7, the inclination angle of the reinforcing cords with respect to the tire circumferential direction ranges from, for example, 10° to 40°. Steel cords are preferably used as the reinforcing cords of the belt layers 7. To improve high-speed durability, at least one belt cover layer 8, formed by arranging reinforcing cords at an angle of, for example, not greater than 5° with respect to the tire circumferential direction, is disposed on an outer circumferential side of the belt layers 7. Nylon, aramid, or similar organic fiber cords are preferably used as the reinforcing cords of the belt cover layer 8.

Note that the tire internal structure described above represents a typical example for a pneumatic tire, and the pneumatic tire is not limited thereto. FIG. 2 illustrates an example of a tread portion of a pneumatic tire according to an embodiment of the present technology. Four main grooves 9 extending in the tire circumferential direction are formed in a tread portion 1. The main grooves 9 includes a pair of inner main grooves 9A, 9A located on both sides of the tire center line CL and a pair of outer main grooves 9B, 9B located on the outermost side in the tire lateral direction. Ribs 10 are defined in the tread portion 1 by the four main grooves 9. The ribs 10 include a center rib 100A located on the tire center line CL, a pair of intermediate ribs 100B, 100C located outward of the center rib 100A in the tire lateral direction, and a pair of shoulder ribs 100D, 100E located outward of the intermediate ribs 100B, 100C in the tire lateral direction.

Sipes 11 including a pair of chamfered portions 12 are formed in each of the center rib 100A and the intermediate ribs 100B, 100C. The sipes 11 includes a sipe 110A disposed in the center rib 100A and sipes 110B, 110C disposed in each of the intermediate ribs 100B, 100C. The chamfered portions 12 include a chamfered portion 120A formed on the sipe 110A, a chamfered portion 120B formed on the sipe 110B, and a chamfered portion 120C formed on the sipe 110C.

The sipes 110A are inclined in the same direction with respect to the tire lateral direction and are formed at intervals in the tire circumferential direction in the center rib 100A. One end of the sipe 110A communicates with the inner main groove 9A, and the other end terminates within the center rib 100A. That is, the sipe 110A is a semi-closed sipe.

The sipes 110B are inclined in the same direction with respect to the tire lateral direction and are formed at intervals in the tire circumferential direction in the intermediate rib 100B. One end of the sipe 110B communicates with the inner main groove 9A, and the other end communicates with the outer main groove 9B. That is, the sipe 110B is an open sipe. The sipes 110C are inclined in the same direction with respect to the tire lateral direction and are formed at intervals in the tire circumferential direction in the intermediate rib 100C. One end of the sipe 110C terminates within the intermediate rib 100C, and the other end communicates with the outer main groove 9B. That is, the sipe 110C is a semi-closed sipe.

Lug grooves 200 that do not communicate with the outer main groove 9B extend in the tire lateral direction, are inclined in the same direction with respect to the tire lateral direction, and are formed at intervals in the tire circumferential direction in the shoulder ribs 100D, 100E. The lug grooves 200 include lug grooves 200A formed in the shoulder rib 100D and lug grooves 200B formed in the shoulder rib 100E.

Figure 3:
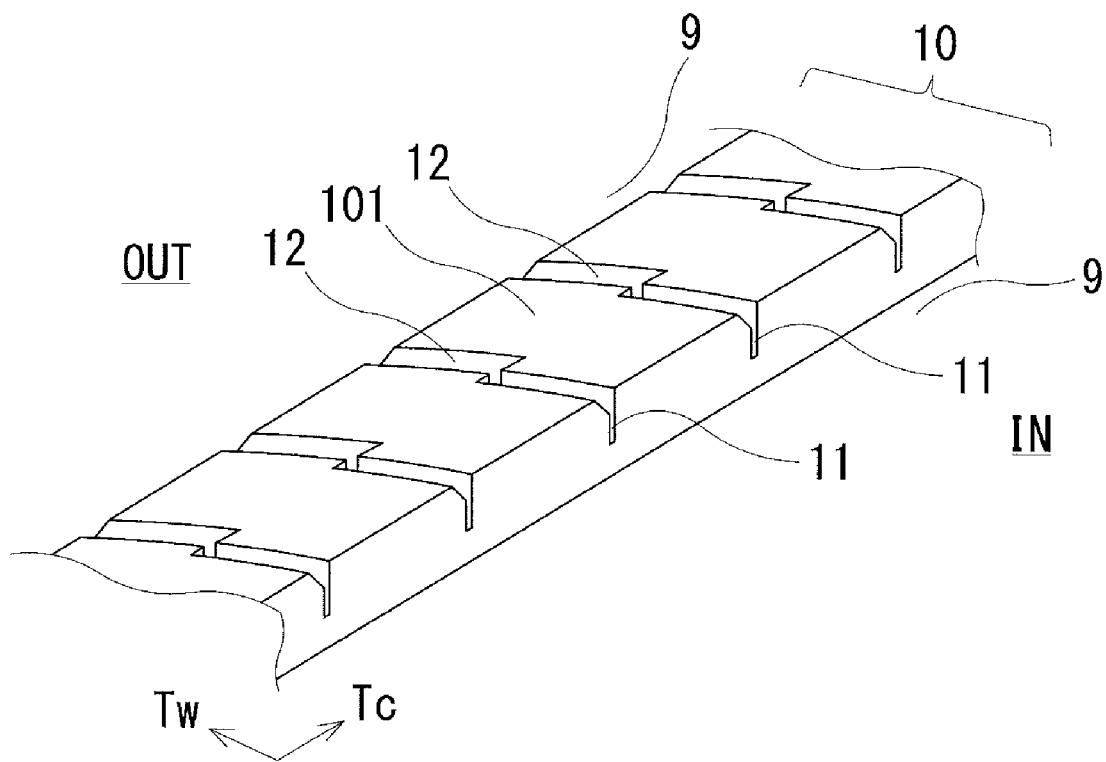
FIG. 3 is a perspective view illustrating a portion of a tread portion of a pneumatic tire according to an embodiment of the present technology.
Figure 4:
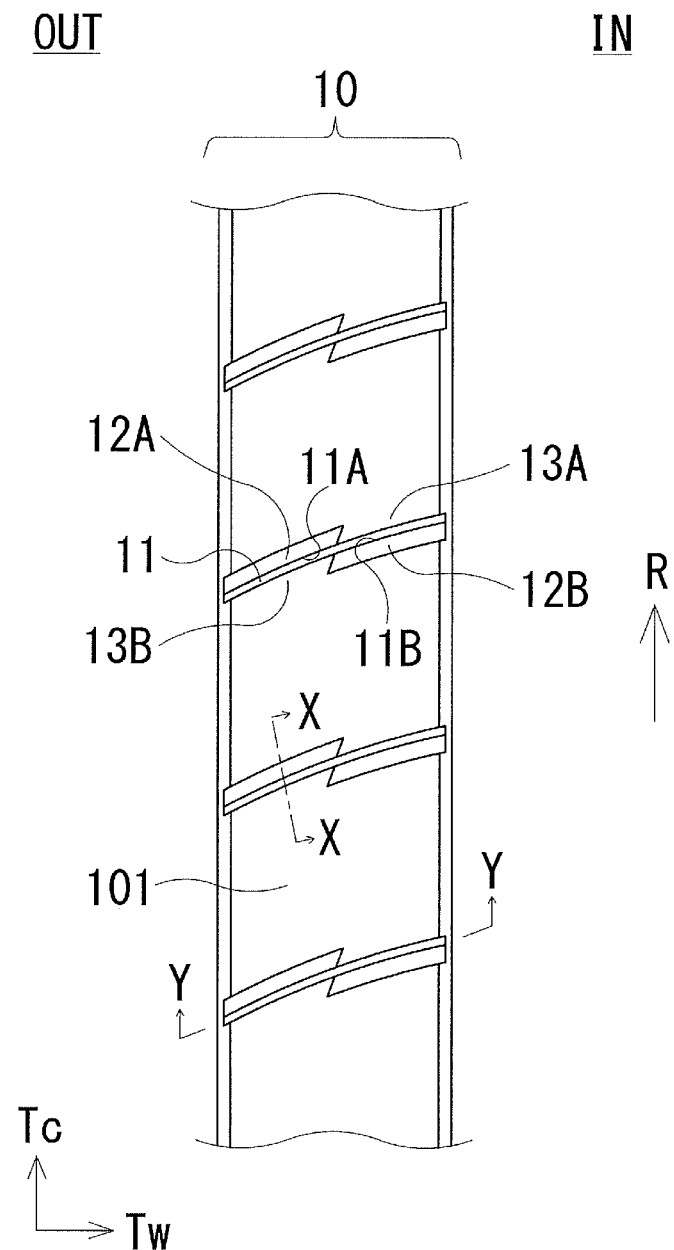
FIG. 4 is a plan view illustrating a portion of a tread portion of a pneumatic tire according to an embodiment of the present technology.
Figure 5:
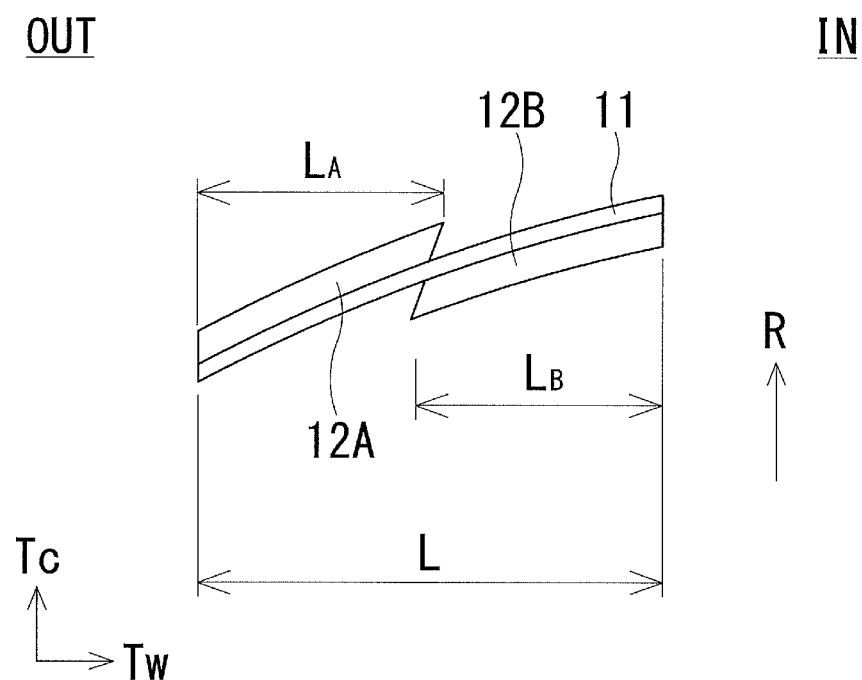
FIG. 5 is a plan view illustrating a sipe and a chamfered portion thereon formed in the tread portion of FIG. 4.

FIGS. 3 to 6 illustrate a portion of a tread portion of a pneumatic tire according to an embodiment of the present technology. In FIGS. 3 to 5, Tc indicates the tire circumferential direction and Tw indicates the tire lateral direction. As illustrated in FIG. 3, the ribs 10 include the sipes 11 extending in the tire lateral direction and blocks 101 defined by the sipes 11. The blocks 101 are provided side by side in the tire circumferential direction. The sipes 11 are narrow grooves having a groove width of 1.5 mm or less.

As illustrated in FIG. 4, the sipes 11 have an overall shape that is curved and are formed in the rib 10 at intervals in the tire circumferential direction. The sipe 11 includes an edge 11A on the leading side with respect to a rotation direction R and an edge 11B on the trailing side with respect to the rotation direction R. The chamfered portions 12 are formed on the edge 11A on the leading side and the edge 11B on the trailing side.

The chamfered portions 12 includes a chamfered portion 12A on the leading side with respect to the rotation direction R and a chamfered portion 12B on the trailing side with respect to the rotation direction R. At portions facing the chamfered portions 12, non-chamfered regions 13 in which other chamfered portions are not present are provided. In other words, a non-chamfered region 13B on the trailing side with respect to the rotation direction R is provided at a portion facing the chamfered portion 12A, and a non-chamfered region 13A on the leading side with respect to the rotation direction R is provided at a portion facing the chamfered portion 12B. The chamfered portion 12 and the non-chamfered region 13 in which other chamfered portions are not present are disposed adjacent to one another on the edge 11A on the leading side and the edge 11B on the trailing side of the sipe 11 in this manner.

As illustrated in FIG. 5, the lengths of the sipe 11 and the chamfered portions 12A, 12B in the tire lateral direction are defined as a sipe length L and chamfer lengths $L_A$, $L_B$, respectively. The sipe length L and the chamfer lengths $L_A$, $L_B$ are lengths in the tire lateral direction from one end portion to the other end portion for each of the sipes 11 and the chamfered portions 12A, 12B. The chamfer lengths $L_A$, $L_B$ of the chamfered portions 12A, 12B are formed shorter than the sipe length L of the sipe 11.

Figure 6:
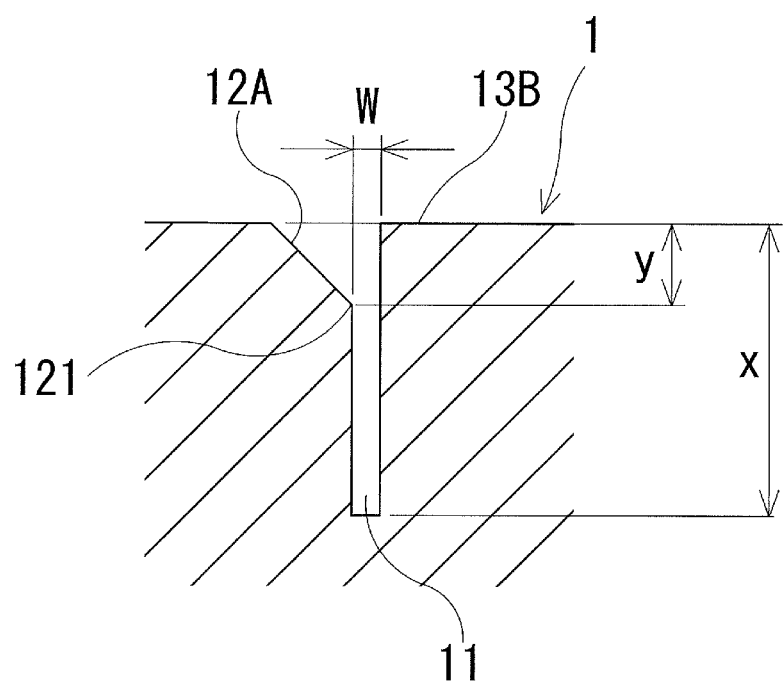
FIG. 6 is a cross-sectional view taken along line X-X in the direction of the arrow in FIG. 4.

FIG. 6 is a view orthogonal to the extension direction of the sipe, with the tread portion 1 cut away in the vertical direction. As illustrated in FIG. 6, the maximum depth of the sipe 11 is x (mm) and the maximum depth of the chamfered portion 12 is y (mm), and the sipe 11 and the chamfered portion 12 are formed so that the maximum depth y (mm) is less than the maximum depth x (mm). The maximum depth x of the sipe 11 is preferably from 3 mm to 8 mm. A sipe width W of the sipe 11 is substantially constant in a range from an end portion 121 located on the inner side of the chamfered portion 12 in the tire radial direction to the groove bottom of the sipe 11. In a configuration in which a protrusion is disposed on the groove wall of the sipe 11, for example, the sipe width W does not include the height of the protrusion. Also, in a configuration in which the sipe width of the sipe 11 gradually narrows toward the groove bottom, the width of the sipe 11 is substantially measured as the sipe width not including the narrow portion.

In the pneumatic tire described above, for all of the chamfered portions, including at least the chamfered portions 12 of the sipes 11, formed on grooves other than the main grooves 9, a total projected area $A_{IN}$ of all the chamfered portions located on the vehicle mounting inner side and a total projected area $A_{OUT}$ of all the chamfered portions located on the vehicle mounting outer side satisfy the relationship $A_{IN} > A_{OUT}$. In the embodiment of FIG. 2, since only the sipes 11 are provided with a chamfered portion, all of the chamfered portions formed on grooves other than the main grooves 9 (the sipes 11 and the lug grooves 200) are configured by the chamfered portions 12, and the total projected area $A_{OUT}$ of all the chamfered portions 120C located on the vehicle mounting outer side is less than the total projected area $A_{IN}$ of all the chamfered portions 120A, 120B located on the vehicle mounting inner side. Thus, as a method for making the total projected area $A_{OUT}$ of all the chamfered portions located on the vehicle mounting outer side less than the total projected area $A_{IN}$ of all the chamfered portions located on the vehicle mounting inner side, the total number of the sipes 11 located on the vehicle mounting outer side can be made less than the total number of the sipes 11 located on the vehicle mounting inner side, a chamfered portion can be provided on a groove in addition to the sipe 11 (for example, a sipe or a lug groove) located on the vehicle mounting inner side, and the like. Also, as illustrated in FIG. 7, the total number of sipes 11 can be the same on the vehicle mounting inner side and the vehicle mounting outer side and the shape of the chamfered portions 12 of the sipes 11 can be vastly different on the vehicle mounting inner side and the vehicle mounting outer side, and the total projected area of the chamfered portions 12 of the sipes 11 located on the vehicle mounting outer side can be made relatively small, and the relationship $A_{IN} > A_{OUT}$ can be satisfied.

Figure 7:
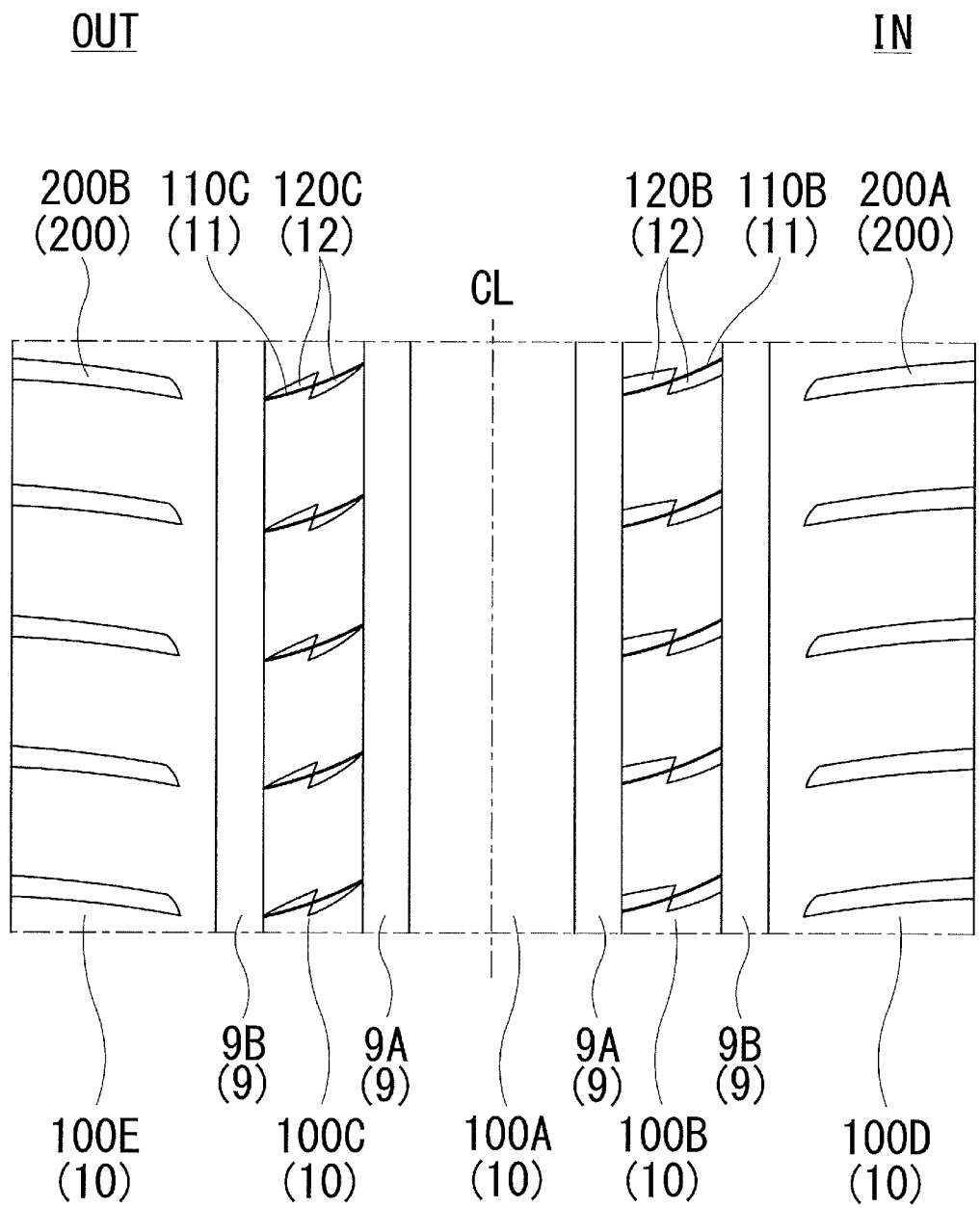
FIG. 7 is a plan view illustrating a modified example of a tread portion of a pneumatic tire according to an embodiment of the present technology.

As illustrated in FIG. 7, the tread portion 1 is defined by four main grooves 9 that extend in the tire circumferential direction and includes the center rib 100A located on the tire center line CL, the pair of intermediate ribs 100B, 100C located outward of the center rib 100A in the tire lateral direction, and the pair of shoulder ribs 100D, 100E located outward of the intermediate ribs 100B, 100C in the tire lateral direction. Grooves are not formed in the center rib 100A, the sipes 110B, 110C including the chamfered portions 120B, 120C are formed in the intermediate ribs 100B, 100C, respectively, and the lug grooves 200A, 200B are formed in the shoulder ribs 100D, 100E, respectively. Additionally, the chamfered portions 120B, 120C have an outer edge profile line that is not parallel with the ridge line of the sipes 110B, 110C, the chamfered portion 120B increases in width from the center side of the rib 10 toward the main groove 9 side, and the chamfered portion 120C decreases in width from the center side of the rib 10 toward the main groove 9 side. Furthermore, since chamfered portions are provided only in the sipes 11, all of the chamfered portions formed on the grooves other than the main grooves 9 (the sipes 11 and the lug grooves 200) are constituted by the chamfered portions 120B, 120C. That is, the total projected area $A_{IN}$ of all the chamfered portions 120B located on the vehicle mounting inner side and the total projected area $A_{OUT}$ of all the chamfered portions 120C positioned on the vehicle mounting outer side satisfy the relationship $A_{IN} > A_{OUT}$.

In the pneumatic tire described above, the chamfered portion 12 that is shorter than the sipe length L of the sipe 11 is provided on each of the edge 11A on the leading side and the edge 11B on the trailing side of the sipe 11, and the non-chamfered regions 13 in which other chamfered portions are not present, are disposed at the portions facing the chamfered portions 12 of the sipe 11. Thus, the drainage effect can be improved with the chamfered portions 12, and a water film can be effectively removed by the edge effect in the non-chamfered regions 13 in which the chamfered portion 12 is not provided. As a result, the steering stability performance on wet road surfaces can be greatly improved. Moreover, the chamfered portion 12 and the non-chamfered region 13 in which chamfered portions are not present, are disposed alongside each other on the edge 11A on the leading side and the edge 11B on the trailing side in this manner. Thus, the effect of enhancing wet performance as described above when braking and driving can be maximally achieved. Furthermore, the vehicle mounting outer side is a large contributor to noise performance. Thus, for all the chamfered portions, including at least the chamfered portions 12 of the sipes 11, which are chamfered portions formed on grooves other than the main grooves 9, by the total projected area $A_{OUT}$ of the chamfered portions located on the vehicle mounting outer side being relatively small, the ground contact pressure on the vehicle mounting outer side can be reduced, which leads to a reduction in noise generated when running. As a result, the steering stability performance on dry road surfaces, the steering stability performance on wet road surfaces, and noise performance can be enhanced in a well-balanced manner.

In the pneumatic tire described above, the maximum depth x (mm) and the maximum depth y (mm) preferably satisfy the relationship of Formula (1) below. By providing the sipes 11 and the chamfered portions 12 so as to satisfy the relationship of Formula (1) below, compared to a known chamfered sipe, the chamfered area can be minimized, so the steering stability performance on dry road surfaces can be improved. As a result, the steering stability performance on dry road surfaces and the steering stability performance on wet road surfaces can be improved in a compatible manner. Here, when $y < x \times 0.1$ is true, the drainage effect from the chamfered portions 12 is insufficient, and when $y > x \times 0.3 + 1.0$ is true, the rigidity of the rib 10 is reduced, leading to a reduction in the steering stability performance on dry road surfaces. In particular, the relationship $y \leq x \times 0.3 + 0.5$ is preferably satisfied.

$$x \times 0.1 \leq y \leq x \times 0.3 + 1.0 \quad (1)$$

For the all chamfered portions, the total projected area $A_{IN}$ of the chamfered portions located on the vehicle mounting inner side and the total projected area $A_{OUT}$ of the chamfered portions located on the vehicle mounting outer side preferably satisfy the following Formula (2). More preferably, the range is from 10% to 30%. By setting the total projected area difference between the total projected area $A_{IN}$ of the chamfered portions on the vehicle mounting inner side and the total projected area $A_{OUT}$ of the chamfered portions on the vehicle mounting outer side in this manner, an effect of suppressing noise can be obtained, and both the steering stability performance on dry road surfaces and the steering stability performance on wet road surfaces can be enhanced.

$$3\% \leq (A_{IN} - A_{OUT})/A_{IN} \times 100\% \leq 50\% \quad (2)$$

In the pneumatic tire described above, the sipes 11 are preferably disposed in two or more ribs 10 of the plurality of ribs 10 defined by the main grooves 9. With the sipes 11 being disposed in two or more of the ribs 10 in this manner, the steering stability performance on dry road surfaces and the steering stability performance on wet road surfaces can be enhanced in a well-balanced manner.

In particular, all the chamfered portions including at least the chamfered portions 12 of the sipes 11, which are chamfered portions formed on grooves other than the main grooves 9, are preferably configured by the chamfered portion 12 of the sipe 11. In such a case, the total projected area difference ($A_{IN} - A_{OUT}$) between the total projected area $A_{IN}$ of all the chamfered portions on the vehicle mounting inner side and the total projected area $A_{OUT}$ of all the chamfered portions on the vehicle mounting outer side is equal to the total projected area difference ($A_{IN}' - A_{OUT}'$) between the total projected area $A_{IN}'$ of the chamfered portions 12 of the sipes 11 on the vehicle mounting inner side and the total projected area $A_{OUT}'$ of the chamfered portions 12 of the sipes 11 on the vehicle mounting outer side. With all of the chamfered portions described above being configured by only the chamfered portion 12 in this manner, the steering stability performance on dry road surfaces and the steering stability performance on wet road surfaces can be enhanced in a well-balanced manner.

Figure 8:
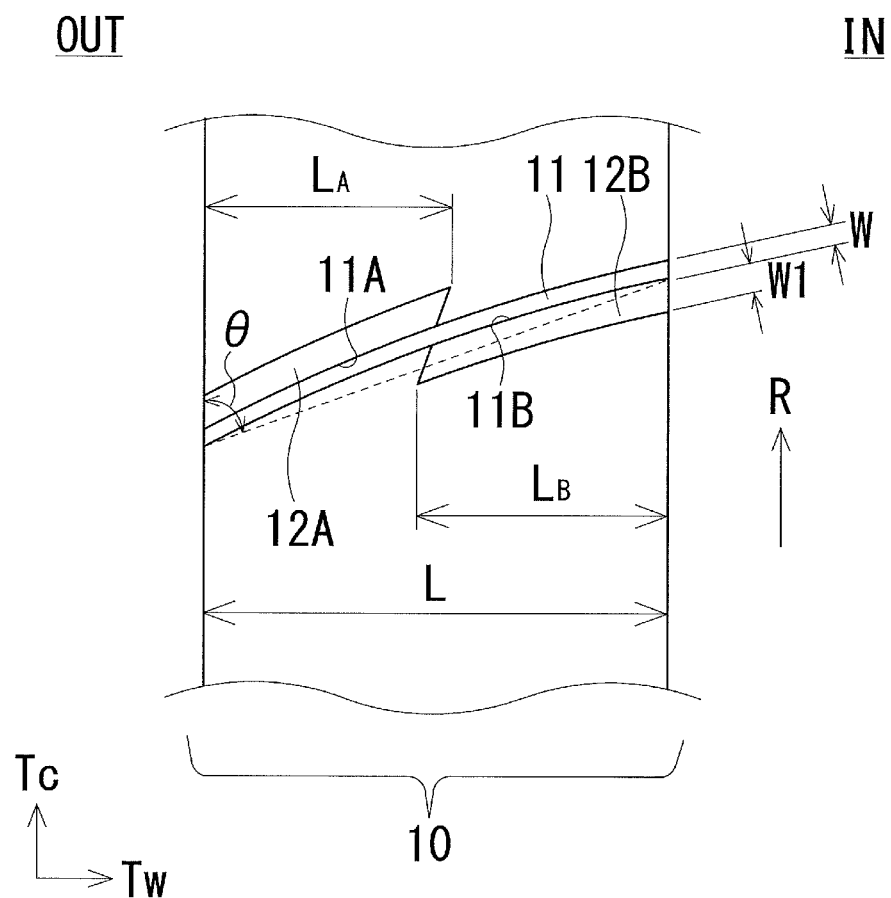
FIG. 8 is a plan view illustrating another modified example of a sipe and chamfered portions thereon of a pneumatic tire according to an embodiment of the present technology.

FIG. 8 is a diagram illustrating another modified example of a sipe and chamfered portions thereon formed in the tread portion of a pneumatic tire according to an embodiment of the present technology. The sipe 11 illustrated in FIG. 8 is formed with an inclination angle θ with respect to the tire circumferential direction. This inclination angle θ refers to the angle formed by an imaginary line (the dotted line illustrated in FIG. 8) connecting both end portions of the sipe 11 and the side surface of the block 101. The inclination angle θ has an inclination angle on the acute angle side and an inclination angle on the obtuse angle side. In FIG. 8, the inclination angle θ on the acute angle side is illustrated. The inclination angle θ is the inclination angle of the sipe 11 at the intermediate pitch within the rib 10. Here, the inclination angle θ on the acute angle side is preferably from 40° to 80°, and more preferably from 50° to 70°. With the sipe 11 being inclined with respect to the tire circumferential direction in this way, pattern rigidity can be improved, and the steering stability performance on dry road surfaces can be further improved. Here, when the inclination angle θ is less than 40°, uneven wear resistance performance is degraded. When the inclination angle θ exceeds 80°, pattern rigidity cannot be sufficiently improved.

In an embodiment of the present technology, the side having the inclination angle θ on the acute angle side of the sipe 11 is defined as the acute angle side, and the side having the inclination angle θ on the obtuse angle side of the sipe 11 is defined as the obtuse angle side. The chamfered portions 12A, 12B formed on the edges 11A, 11B of the sipe 11 are formed on the acute angle side of the sipe 11. With the sipe 11 being chamfered on the acute angle side in this manner, uneven wear resistance performance can be further enhanced. Alternatively, the chamfered portions 12A, 12B may be formed on the obtuse angle side of the sipe 11. With the chamfered portion 12 being formed on the obtuse angle side of the sipe 11 in this manner, the edge effect is increased, and the steering stability performance on wet road surfaces can be further improved.

In an embodiment of the present technology, the overall shape of the sipe 11 described above is curved, allowing the steering stability performance on wet road surfaces to be improved. However, a portion of the sipe 11 may have a curved or bent shape in a plan view. With the sipe 11 being formed in this manner, the total amount of edges 11A, 11B of the sipes 11 is increased, and the steering stability performance on wet road surfaces can be improved.

As illustrated in FIG. 8, one chamfered portion 12 is disposed on each of the edge 11A on the leading side and the edge 11B on the trailing side of the sipe 11. With the chamfered portions 12 being disposed in this manner, uneven wear resistance performance can be improved. Here, when two or more chamfered portions 12 are formed in each of the edge 11A on the leading side and the edge 11B on the trailing side of the sipe 11, the number of nodes increases, which tends to deteriorate uneven wear resistance performance.

The maximum width of the chamfered portion 12 measured in the direction orthogonal to the sipe 11 is defined as a width W1. The maximum width W1 of the chamfered portion 12 is preferably from 0.8 times to 5.0 times the sipe width W of the sipe 11, and more preferably from 1.2 times to 3.0 times. With the maximum width W1 of the chamfered portion 12 being appropriately set with respect to the sipe width W in this manner, the steering stability performance on dry road surfaces and the steering stability performance on wet road surfaces can be improved in a compatible manner. When the maximum width W1 of the chamfered portion 12 is less than 0.8 times the sipe width W of the sipe 11, the steering stability performance on wet road surfaces cannot be sufficiently improved, and when the maximum width W1 is greater than 5.0 times the sipe width W, the steering stability performance on dry road surfaces cannot be sufficiently improved.

Furthermore, the outer edge portion in the longitudinal direction of the chamfered portion 12 is formed parallel with the extension direction of the sipe 11. With the chamfered portion 12 extending parallel with the sipe 11 in this way, uneven wear resistance performance can be improved, and the steering stability performance on dry road surfaces and the steering stability performance on wet road surfaces can be improved in a compatible manner.

As illustrated in FIG. 8, end portions of the chamfered portions 12A, 12B located near the main grooves 9 communicate with the main grooves 9 located on either side of the rib 10. With the chamfered portions 12A, 12B being formed in this manner, the steering stability performance on wet road surfaces can be further improved. Alternatively, the end portions of the chamfered portions 12A, 12B located near the main grooves 9 may terminate within the rib 10 without communicating with the main grooves 9. With the chamfered portions 12A, 12B being formed in this manner, the steering stability performance on dry road surfaces can be further improved.

Figure 9A:
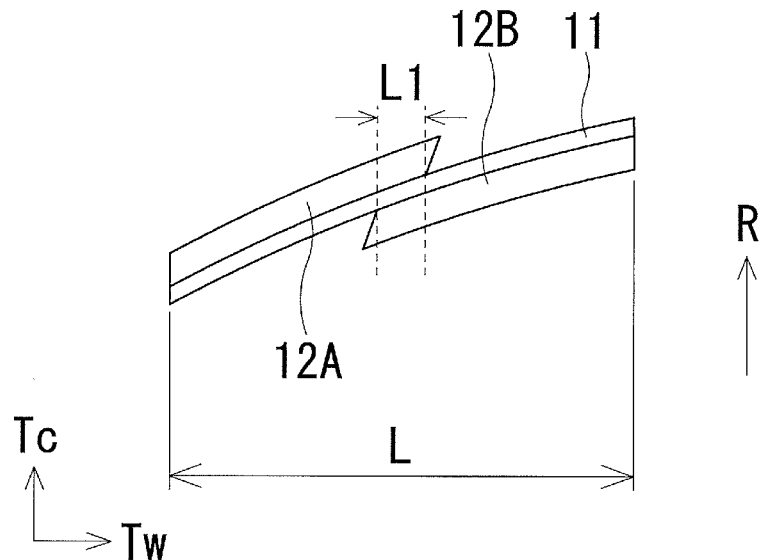
FIGS. 9A and 9B are plan views illustrating another modified example of a sipe and chamfered portions thereon of a pneumatic tire according to an embodiment of the present technology.
Figure 9B:
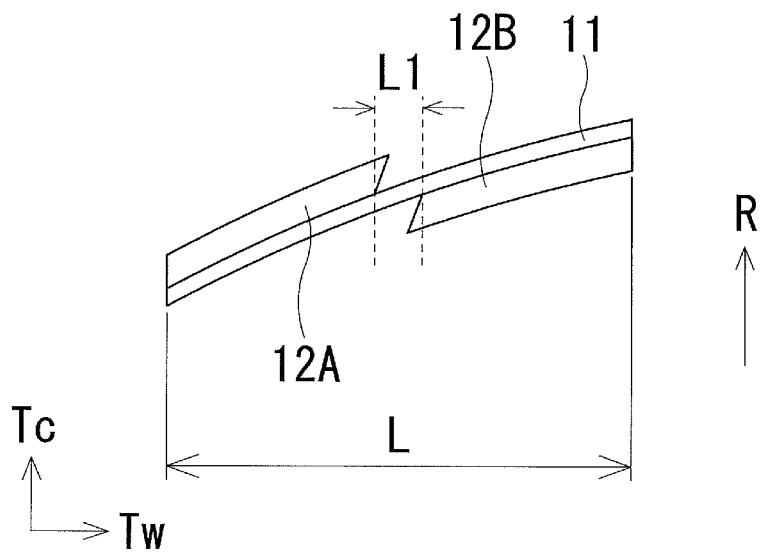

FIGS. 9A and 9B are diagrams illustrating another modified example of a sipe and chamfered portions thereon formed in the tread portion of a pneumatic tire according to an embodiment of the present technology. As illustrated in FIG. 9A, the chamfered portion 12A and the chamfered portion 12B are formed so that a portion of both of the chamfered portions 12A, 12B overlap in a central portion of the sipe 11. Here, the length in the tire lateral direction of the overlapping portion, which is a portion where the chamfered portion 12A and the chamfered portion 12B overlap, is defined as an overlap length L1. On the other hand, as illustrated in FIG. 9B, when a portion of both the chamfered portion 12A and the chamfered portion 12B do not overlap and are separated by a certain interval, the proportion of the overlap length L1 with respect to the sipe length L is expressed as a negative value. The overlap length L1 of the overlapping portion is preferably from −30% to 30% of the sipe length L, and more preferably from −15% to 15%. With the overlap length L1 of the chamfered portion 12 being appropriately set with respect to the sipe length L in this manner, the steering stability performance on dry road surfaces and the steering stability performance on wet road surfaces can be improved in a compatible manner. Here, when the overlap length L1 is greater than 30%, the steering stability performance on dry road surfaces is not sufficiently improved, and when the overlap length L1 is less than −30%, the steering stability performance on wet road surfaces is not sufficiently improved.

Figure 10:
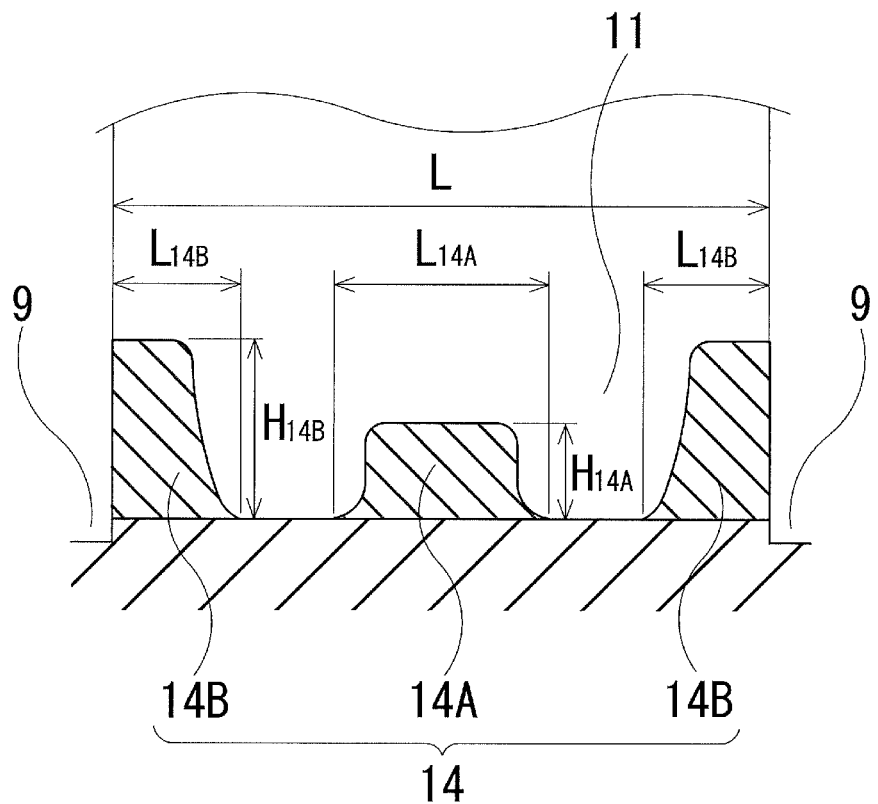
FIG. 10 is a cross-sectional view taken along line Y-Y in the direction of the arrow of FIG. 4.

FIG. 10 is a view of the sipe cut away in the extension direction. As illustrated in FIG. 10, the sipe 11 includes a raised bottom portion 14 in a portion of the sipe 11 in the length direction. As the raised bottom portion 14, a raised bottom portion 14A located in the central portion of the sipe 11 and raised bottom portions 14B located at both end portions of the sipe 11 are present. By providing the raised bottom portion 14 in the sipe 11 in this manner, the steering stability performance on dry road surfaces and the steering stability performance on wet road surfaces can be improved in a compatible manner. The raised bottom portion 14 of the sipe 11 may be formed at the end portion and/or not at the end portion of the sipe 11.

The height in the tire radial direction of the raised bottom portion 14 formed in the sipe 11 is defined as a height $H_{14}$. For the raised bottom portion 14A formed not at the end portion of the sipe 11, the maximum height from the groove bottom of the sipe 11 to the top surface of the raised bottom portion 14A is defined as a height $H_{14A}$. The height $H_{14A}$ is preferably from 0.2 times to 0.5 times the maximum depth x of the sipe 11, and more preferably from 0.3 times to 0.4 times. By setting the height $H_{14A}$ of the raised bottom portion 14A disposed not at the end portion of the sipe 11 to a suitable height, the rigidity of the block 101 can be improved and the drainage effect can be maintained. As a result, the steering stability performance on wet road surfaces can be improved. Here, when the height $H_{14A}$ is less than 0.2 times the maximum depth x of the sipe 11, the rigidity of the block 101 cannot be sufficiently improved, and when the height $H_{14A}$ is greater than 0.5 times the maximum depth x of the sipe 11, the steering stability performance on wet road surfaces cannot be sufficiently improved.

For the raised bottom portions 14B formed at both end portions of the sipe 11, the maximum height from the groove bottom of the sipe 11 to the top surface of the raised bottom portion 14B is defined as a height $H_{14B}$. The height $H_{14B}$ is preferably from 0.6 times to 0.9 times the maximum depth x of the sipe 11, and more preferably from 0.7 times to 0.8 times. By setting the height $H_{14B}$ of the raised bottom portions 14B disposed at the end portions of the sipe 11 to a suitable height, the rigidity of the block 101 can be improved and the steering stability performance on dry road surfaces can be improved. Here, when the height $H_{14B}$ is less than 0.6 times the maximum depth x of the sipe 11, the rigidity of the block 101 cannot be sufficiently improved, and when the height $H_{14B}$ is greater than 0.9 times the maximum depth x of the sipe 11, the steering stability performance on wet road surfaces cannot be sufficiently improved.

The length in the tire lateral direction of the raised bottom portion 14 of the sipe 11 is defined as a raised bottom length $L_{14}$. The raised bottom lengths $L_{14A}$, $L_{14B}$ of the raised bottom portions 14A, 14B is preferably from 0.3 times to 0.7 times the sipe length L, and more preferably from 0.4 times to 0.6 times. By the raised bottom lengths $L_{14A}$, $L_{14B}$ of the raised bottom portions 14A, 14B being appropriately set in this manner, the steering stability performance on dry road surfaces and the steering stability performance on wet road surfaces can be improved in a compatible manner.

Examples

Tires according to a Conventional Example 1, 2 and Examples 1 to 5 were manufactured. The tires have a tire size of 245/40R19 and a designated mounting direction with respect to a vehicle and include, in a tread portion, main grooves extending in the tire circumferential direction, ribs defined by the main grooves, and sipes extending in the tire lateral direction in the ribs. The tires are set as indicated in Table 1 for the following: chamfer arrangement (both sides or one side), size relationship between sipe length L and chamfer lengths $L_A$, $L_B$, chamfer provided at portion facing chamfered portion, size relationship between total projected area $A_{IN}$ of all chamfered portions on the vehicle mounting inner side and total projected area $A_{OUT}$ of all chamfered portions on the vehicle mounting outer side, sipe width, total projected area difference between all chamfered portions on vehicle mounting inner side and all chamfered portions on vehicle mounting outer side (($A_{IN} - A_{OUT}$)/$A_{IN} \times 100\%$), the number of ribs with sipes including chamfered portions, and total projected area difference between chamfered portions of sipes on the vehicle mounting inner side and chamfered portions of sipes on the vehicle mounting outer side (($A_{IN}'$ - $A_{OUT}'$)/$A_{IN}' \times 100\%$).

Note that in Table 1, when the value of the "total projected area difference between all chamfered portions on vehicle mounting inner side and all chamfered portions on vehicle mounting outer side" is the same as the value of the "total projected area difference between chamfered portions of sipes on vehicle mounting inner side and chamfered portions of sipes on vehicle mounting outer side", this means that all the chamfered portions including at least the chamfered portions of the sipes, which are chamfered portions formed on grooves other than main grooves, are configured by the chamfered portion of the sipe.

These test tires underwent a sensory evaluation by a test driver for steering stability performance on dry road surfaces and steering stability performance on wet road surfaces and a sensory evaluation for noise performance. The results thereof are shown in Table 1.

Sensory evaluation for steering stability performance on dry road surfaces and steering stability performance on wet road surfaces was performed with the test tires on a wheel with a rim size of 19×8.5 J mounted on a vehicle and inflated to an air pressure of 260 kPa. Evaluation results are expressed as index values, with the results of Conventional Example 1 being assigned as an index value of 100. Larger index values indicate superior steering stability performance on dry road surfaces and steering stability performance on wet road surfaces.

The sensory evaluation for noise performance was performed with the test tires on a wheel with a rim size of 19×8.5 J mounted on a vehicle and inflated to an air pressure of 260 kPa. Evaluation results are expressed as index values, with the results of Conventional Example 1 being assigned as an index value of 100. Larger index values indicate superior noise performance.

TABLE 1

|  | Conventional Example 1 | Conventional Example 2 | Example 1 |
|---|---|---|---|
| Chamfer arrangement (both sides or one side) | Both sides | Ones ide | Both sides |
| Size relationship between sipe length L and chamfer lengths $L_A$, $L_B$ | $L = L_A, L_B$ | $L = L_A$ | $L > L_A, L_B$ |
| Chamfer provided at portion facing chamfered portion | Yes | No | No |
| Size relationship between total projected area $A_{IN}$ of all chamfered portions on vehicle mounting inner side and total projected area $A_{OUT}$ of all chamfered portions on vehicle mounting outer side | $A_{IN} = A_{OUT}$ | $A_{IN} = A_{OUT}$ | $A_{IN} > A_{OUT}$ |
| Sipe width | Constant | Changes | Changes |
| Total projected area difference between all chamfered portions on vehicle mounting inner side and all chamfered portions on vehicle mounting outer side (($A_{IN} - A_{OUT}$)/$A_{IN} \times 100\%$) | 0% | 0% | 3% |
| Number of ribs with sipes including chamfered portions | 1 | 1 | 1 |
| Total projected area difference between chamfered portions of sipes on vehicle mounting inner side and chamfered portions of sipes on vehicle mounting outer side (($A_{IN}'$ - $A_{OU}'$)/$A_{IN}' \times 100\%$) | 0% | 0% | 3% |
| Steering stability performance on dry road surfaces | 100 | 90 | 105 |
| Steering stability performance on wet road surfaces | 100 | 105 | 105 |
| Noise performance | 100 | 100 | 102 |

TABLE 1-continued

|  | Example 2 | Example 3 | Example 4 | Example 5 |
|---|---|---|---|---|
| Chamfer arrangement (both sides or one side) | Both sides | Both sides | Both sides | Both sides |
| Size relationship between sipe length L and chamfer lengths $L_A$, $L_B$ | $L > L_A, L_B$ | $L > L_A, L_B$ | $L > L_A, L_B$ | $L > L_A, L_B$ |
| Chamfer provided at portion facing chamfered portion | No | No | No | No |
| Size relationship between total projected area $A_{IN}$ of all chamfered portions on vehicle mounting inner side and total projected area $A_{OUT}$ of all chamfered portions on vehicle mounting outer side | $A_{IN} > A_{OUT}$ | $A_{IN} > A_{OUT}$ | $A_{IN} > A_{OUT}$ | $A_{IN} > A_{OUT}$ |
| Sipe width | Constant | Constant | Constant | Constant |
| Total projected area difference between all chamfered portions on vehicle mounting inner side and all chamfered portions on vehicle mounting outer side $((A_{IN} - A_{OUT})/A_{IN} \times 100\%)$ | 3% | 20% | 20% | 20% |
| Number of ribs with sipes including chamfered portions | 1 | 1 | 3 | 3 |
| Total projected area difference between chamfered portions of sipes on vehicle mounting inner side and chamfered portions of sipes on vehicle mounting outer side $((A_{IN}' - A_{OUT}')/A_{IN}' \times 100\%)$ | 3% | 3% | 3% | 20% |
| Steering stability performance on dry road surfaces | 106 | 107 | 108 | 109 |
| Steering stability performance on wet road surfaces | 106 | 107 | 108 | 109 |
| Noise performance | 102 | 102 | 104 | 104 |

As can be seen from Table 1, by devising the shape of the chamfered portions formed on the sipes, the tires of Examples 1 to 5 have enhanced noise performance and both enhanced steering stability performance on dry road surfaces and enhanced steering stability performance on wet road surfaces.

The invention claimed is:

1. A pneumatic tire with a designated mounting direction with respect to a vehicle, comprising:
   in a tread portion, main grooves extending in a tire circumferential direction; and
   a sipe extending in a tire lateral direction disposed in ribs defined by the main grooves; wherein
   the sipe comprises an edge on a leading side and an edge on a trailing side;
   the edge on the leading side and the edge on the trailing side each comprise a chamfered portion shorter than a sipe length of the sipe, only one of the chamfered portions being present on each of the leading side and the trailing side;
   a non-chamfered region in which other chamfered portions are not present is provided at portions facing the chamfered portions of the sipe; and
   for all chamfered portions, comprising at least the chamfered portions of the sipe, formed on grooves other than the main grooves, a total projected area $A_{IN}$ of the chamfered portions located on a vehicle mounting inner side and a total projected area $A_{OUT}$ of the chamfered portions located on a vehicle mounting outer side satisfy a relationship $A_{IN} > A_{OUT}$, and the ribs are intermediate land portions disposed offset from the tire equatorial plane, the sipe in one of the intermediate land portions opens at ends to two of the main grooves, and the sipe in an other one of the intermediate land portions terminates in the other one of the intermediate land portions.

2. The pneumatic tire according to claim 1, wherein
   a maximum depth x (mm) of the sipe and a maximum depth y (mm) of the chamfered portions satisfy a relationship $x \times 0.1 \leq y \leq x \times 0.3 + 1.0$; and
   a sipe width of the sipe is constant in a range from an end portion located on an inner side in a tire radial direction of the chamfered portions to a groove bottom of the sipe.

3. The pneumatic tire according to claim 1, wherein the total projected area $A_{IN}$ of the chamfered portions located on the vehicle mounting inner side and the total projected area $A_{OUT}$ of the chamfered portions located on the vehicle mounting outer side satisfy a relationship $$3\% \leq (A_{IN} - A_{OUT})/A_{IN} \times 100\% \leq 50\%.$$

4. The pneumatic tire according to claim 1, wherein the sipe is disposed in two or more ribs of the ribs defined by the main grooves.

5. The pneumatic tire according to claim 4, wherein the all chamfered portions consist of the chamfered portions of the sipes.

6. The pneumatic tire according to claim 2, wherein the total projected area $A_{IN}$ of the chamfered portions located on the vehicle mounting inner side and the total projected area $A_{OUT}$ of the chamfered portions located on the vehicle mounting outer side satisfy a relationship $3\% \leq (A_{IN} - A_{OUT})/A_{IN} \times 100\% \leq 50\%$.

7. The pneumatic tire according to claim 6, wherein the sipe is disposed in two or more ribs of the ribs defined by the main grooves.

8. The pneumatic tire according to claim 7, wherein the all chamfered portions consist of the chamfered portions of the sipes.

* * * * *